US009321055B2

(12) United States Patent
Akdim et al.

(10) Patent No.: US 9,321,055 B2
(45) Date of Patent: Apr. 26, 2016

(54) GAS ELECTROSTATIC COALESCER

(75) Inventors: Mohamed Reda Akdim, Nieuwegein (NL); Govert L. Kruijtzer, Utrecht (NL); Pavel Antsiferov, Moscow (RU)

(73) Assignee: FMC Technologies, Inc., Houston, TX (US)

( * ) Notice: Subject to any disclaimer, the term of this patent is extended or adjusted under 35 U.S.C. 154(b) by 877 days.

(21) Appl. No.: 13/127,245

(22) PCT Filed: Nov. 5, 2009

(86) PCT No.: PCT/US2009/063398
§ 371 (c)(1),
(2), (4) Date: Jul. 25, 2011

(87) PCT Pub. No.: WO2010/054080
PCT Pub. Date: May 14, 2010

(65) Prior Publication Data
US 2012/0085230 A1    Apr. 12, 2012

Related U.S. Application Data

(60) Provisional application No. 61/111,444, filed on Nov. 5, 2008.

(51) Int. Cl.
*B03C 3/14* (2006.01)
*B03C 3/47* (2006.01)
(Continued)

(52) U.S. Cl.
CPC . *B03C 3/68* (2013.01); *B03C 3/017* (2013.01); *B03C 3/08* (2013.01); *B03C 3/366* (2013.01); *B03C 9/00* (2013.01); *B03C 11/00* (2013.01); *B03C 2201/02* (2013.01)

(58) Field of Classification Search
CPC ............ B03C 3/00; B03C 3/70; B03C 3/47; B03C 3/68; B03C 11/00; B03C 3/017; B03C 3/08; B03C 3/366; B03C 9/00; B03C 2201/02; B01D 17/06
USPC .......... 95/2, 57, 79; 96/18, 75, 79, 88, 78, 86, 96/87
See application file for complete search history.

(56) References Cited

U.S. PATENT DOCUMENTS

| 2,767,359 | A | 10/1956 | Grayland et al. | ............. 317/262 |
| 3,410,307 | A | 11/1968 | Pinchas | ......................... 137/872 |

(Continued)

FOREIGN PATENT DOCUMENTS

| AU | 2002256837 B2 | 5/2003 | ............. B01D 17/04 |
| CN | 201002057 Y | 1/2008 | |

(Continued)

OTHER PUBLICATIONS

FR 2663947 A1 English Translation via Espacenet.*

(Continued)

*Primary Examiner* — Amber R Orlando
*Assistant Examiner* — Britanny Precht
(74) *Attorney, Agent, or Firm* — Amerson Law Firm, PLLC (57) ABSTRACT

An electrostatic coalescer that includes an outer wall defining a flow path for receiving a process fluid comprising primarily a gas, a power source, a plurality of electrode plates coupled to the power source to generate an electrical field across the flow path wherein each of the plurality of electrode plates is coated with an insulation material and at least one insulating member is disposed between two adjacent electrode plates.

23 Claims, 9 Drawing Sheets

(51) Int. Cl.
*B03C 3/66* (2006.01)
*B03C 3/68* (2006.01)
*B03C 3/017* (2006.01)
*B03C 3/08* (2006.01)
*B03C 3/36* (2006.01)
*B03C 11/00* (2006.01)
*B03C 9/00* (2006.01)

(56) References Cited

U.S. PATENT DOCUMENTS

| | | | |
|---|---|---|---|
| 3,727,380 A * | 4/1973 | Remick | 96/76 |
| 3,837,145 A * | 9/1974 | Festner | 96/88 |
| 3,892,544 A | 7/1975 | Haupt | 55/106 |
| 4,018,578 A * | 4/1977 | Ahlrich | 96/78 |
| 4,056,372 A * | 11/1977 | Hayashi | 96/87 |
| 4,238,326 A | 12/1980 | Wolf | 210/695 |
| 4,313,741 A * | 2/1982 | Masuda et al. | 96/78 |
| 4,325,255 A | 4/1982 | Howard et al. | 73/589 |
| 4,391,698 A | 7/1983 | Wagner | |
| 4,415,426 A | 11/1983 | Hsu et al. | |
| 4,569,684 A * | 2/1986 | Ibbott | 96/79 |
| 4,583,025 A | 4/1986 | Adler et al. | 315/4 |
| 4,592,763 A | 6/1986 | Dietz | 55/2 |
| 4,700,014 A * | 10/1987 | Joy et al. | 96/50 |
| 4,702,815 A | 10/1987 | Prestridge et al. | 204/302 |
| 5,038,780 A | 8/1991 | Boetzkes | 607/50 |
| 5,348,571 A * | 9/1994 | Weber | 96/68 |
| 5,421,863 A * | 6/1995 | Rector et al. | 96/60 |
| 5,421,972 A | 6/1995 | Hickey et al. | 204/186 |
| 5,542,964 A | 8/1996 | Kroeger et al. | |
| 5,545,964 A | 8/1996 | Stephenson et al. | 318/701 |
| 6,086,830 A | 7/2000 | Kartchner | 422/186 |
| 6,117,216 A * | 9/2000 | Loreth | 96/62 |
| 6,117,403 A * | 9/2000 | Alix et al. | 423/210 |
| 6,471,753 B1 * | 10/2002 | Ahn et al. | 96/27 |
| 6,576,107 B2 | 6/2003 | Thompson | 204/572 |
| 6,692,627 B1 * | 2/2004 | Russell et al. | 204/554 |
| 6,860,979 B2 | 3/2005 | Sams | 204/556 |
| 7,077,890 B2 * | 7/2006 | Botvinnik | 96/69 |
| 7,163,624 B2 * | 1/2007 | Nilsen et al. | 210/243 |
| 7,264,659 B1 * | 9/2007 | Moshenrose | 96/86 |
| 7,520,985 B2 | 4/2009 | Nilsen et al. | 210/243 |
| 8,097,072 B1 * | 1/2012 | Taylor | 96/55 |
| 8,690,997 B2 * | 4/2014 | Tatsumi et al. | 96/69 |
| 2002/0185003 A1* | 12/2002 | Potter | 95/57 |
| 2003/0155310 A1 | 8/2003 | Nilsen et al. | |
| 2004/0251213 A1 | 12/2004 | Bradley | |
| 2005/0036924 A1* | 2/2005 | Nilsen et al. | 422/186.04 |
| 2005/0040045 A1 | 2/2005 | Nilsen et al. | 204/672 |
| 2008/0014851 A1* | 1/2008 | Takayanagi | 454/50 |
| 2009/0173684 A1* | 7/2009 | Tryti et al. | 210/243 |
| 2009/0190219 A1* | 7/2009 | Teo et al. | 359/507 |
| 2009/0255816 A1* | 10/2009 | Tryti et al. | 204/672 |
| 2012/0312170 A1* | 12/2012 | Noh et al. | 96/86 |

FOREIGN PATENT DOCUMENTS

| | | | |
|---|---|---|---|
| DE | 4008561 A1 | 9/1991 | B03C 3/68 |
| EP | 0925837 A | 6/1999 | B03C 3/68 |
| FR | 2663947 A1 * | 1/1992 | B01D 17/06 |
| GB | 2386009 A | 9/2003 | B60C 23/04 |
| GB | 2455383 A * | 6/2009 | |
| GB | 2455836 B * | 6/2012 | |
| RU | 2093243 | 10/1997 | B01D 17/06 |
| SD | 1634318 A1 | 3/1989 | B03C 3/68 |
| WO | 99/62611 | 12/1999 | |
| WO | WO03/049834 A1 | 6/2003 | B01D 17/06 |
| WO | WO2004/016907 A1 | 2/2004 | E21B 43/36 |
| WO | 2006/027697 A1 | 3/2006 | |
| WO | 2007/135503 | 11/2007 | |
| WO | 2008/066392 A2 | 6/2008 | |

OTHER PUBLICATIONS

PCT Search Report and Written Opinion from PCT/US2009/063398 dated Jan. 4, 2010.
First Office Action from Chinese Patent Application No. 200980149471.6 dated May 31, 2013.
Extended European Search Report dated Feb. 21, 2014 for EP Application No. 09825412.1.
Search and Examination Report from Singapore Patent Application No. 201102955-0 dated Jun. 28, 2012.
PCT Search Report and Written Opinion from PCT/US2009/063392 dated Feb. 4, 2010.
Patent Examination Report from Australian Patent Application No. 2009313534 dated Sep. 17, 2013.
Official Action from Chinese Patent Application No. 200980143995.4 dated Feb. 4, 2013.
Official Action from European Patent Application No. 09748677.3-1232 dated Feb. 6, 2013.
Official Action from Russian Patent Application No. 2011122607 dated Oct. 24, 2013.
Office Action from related U.S. Appl. No. 13/127,253 dated Dec. 19, 2012.
Final Office Action from related U.S. Appl. No. 13/127,253 dated Jul. 30, 2013.
Office Action from related U.S. Appl. No. 13/127,253 dated Jun. 9, 2014.

* cited by examiner

GAS ELECTROSTATIC COALESCER

CROSS-REFERENCE TO RELATED APPLICATIONS

This is a 371 of PCT/US09/63398, filed Nov. 5, 2009, which claimed priority from U.S. provisional patent application Ser. No. 61/111,444, filed Nov. 5, 2008.

BACKGROUND

The disclosed subject matter relates generally to separating fluids in a process stream and, more particularly, to an electrostatic coalescer for coalescing fluids that are primarily gas.

The separation of water from a hydrocarbon liquid is an important process in the oil production industry. In an oil dominated regime, small water droplets can occur in the continuous oil phase due to shearing in upstream piping, for example. The droplet size is an important contributing factor to the speed of the separation. Small droplets of water in oil separate slowly from the oil compared to larger droplets due to the immiscibility of the liquids and the differences in specific mass.

One conventional approach for oil/water separation makes use of gravity and requires large residence times inside separators. Large residence times are needed for an acceptable separation performance, and therefore this approach is not suitable for an in-line application with high flow rates. Other techniques that use chemicals to break the emulsions require later removal of the chemicals, thereby increasing cost. Still other techniques that employ heating are less effective at breaking emulsions.

The separation of liquids from fluid streams that are primarily gas is also an important process in industry. In many cases, gases with a high economical value are obtained containing very fine droplets of liquids. Examples may be natural gas or many other gases used in the chemical industry, such as chlorine or sulfur dioxide. Also, in process industry, vapors may partly condense, which may also result in gas containing fine liquid droplets, especially in high gas speed applications (i.e., the high speeds provide significant force to draw the droplets along). Further, any obstacle in the flow path may generate high and low pressure areas, resulting in more condensation at the obstacle than compared to low gas speed application, where the pressure differences are much lower.

As these droplets can corrode piping and are harmful for pumps and other processing equipment, they should be removed before packing or transporting the commercial gas or using the gas in a process industry. Further, consumers want their products as pure as possible, and extraneous liquids lower the quality of these gases. In the petrochemical industry, especially off shore, where natural gas is obtained together with salt water and oil, it is beneficial to remove the water and/or other liquids as near to the well as possible. A significant effort is spent drying the natural gas to remove water vapor to concentrations far below saturation with water absorbers. However, such efforts may be inefficient if the gas to be dried contains liquid water in addition to vapors.

Conventional techniques for removing liquids from gases typically aim at improving the traditional separation of liquids from gases by using gravitation-like forces. One very old technique is based on the observation that a piece of cloth hanging in a fog will collect water from the fog, thus decreasing the fog intensity and providing water. The cloth acts as a condensation center for the droplets and gravitation will, in the case of water, cause excess water to flow down. This technique is the basis for the separation of liquids from gases using a mesh wire.

Another technology involves increasing the gravitational forces to make the suspension of liquid droplets more instable in the gas. Gravitational forces can be increased by spinning the medium, which results in a centripetal force of many times normal gravitation. In this manner, the separation proceeds at a rate many times faster than under gravitation alone, resulting in a much smaller apparatus.

Still, for large scale in-line operation both mesh wire technologies and accelerators have their disadvantages. A mesh can become clogged and requires the gas molecules to follow complicated paths through the mesh, costing mechanical energy. Increasing gravitational forces by spinning also requires mechanical energy that is generally drawn from the gas to be separated. This consumed mechanical energy results in a pressure drop, which increases the required number or size of the pumps. Further, both techniques require sensitive equipment that is vulnerable to erosion.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in an electrostatic coalescer. The electrostatic coalescer includes an outer wall defining a flow path for receiving a process fluid comprising primarily a gas, a power source, and a plurality of electrode plates coupled to the power source to generate an electrical field across the flow path.

Another aspect of the disclosed subject matter is seen a method for coalescing a disperse phase component in a process fluid. A flow path for receiving a process fluid primarily comprising gas is provided. The process fluid is passed through an electrical field generated by a plurality of electrode plates to coalesce droplets of the disperse phase component.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
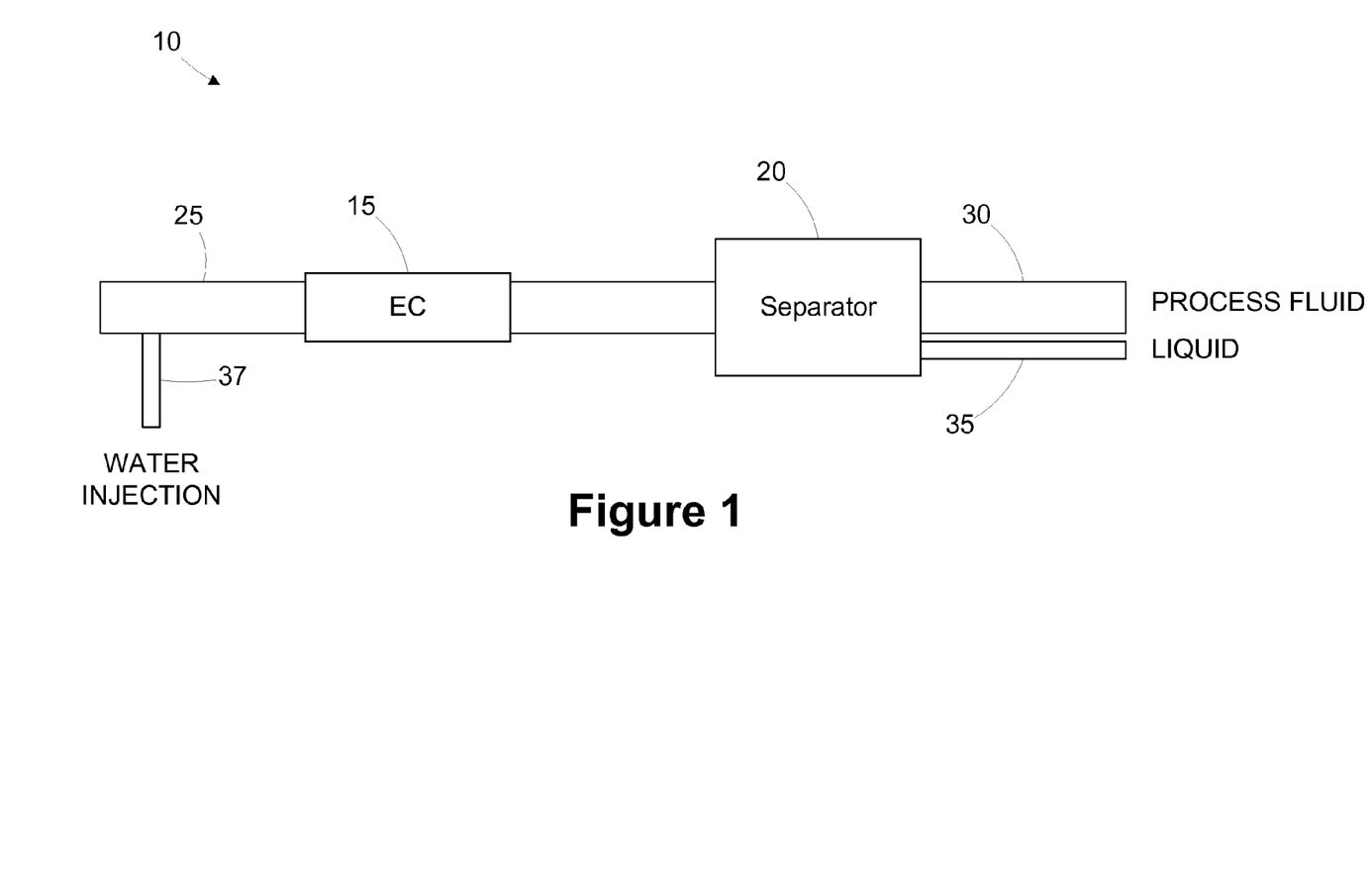
FIG. 1 is a simplified diagram of a fluid separation system in accordance with one illustrative embodiment of the present subject matter.

Referring now to the drawings wherein like reference numbers correspond to similar components throughout the several views and, specifically, referring to FIG. 1, the disclosed subject matter shall be described in the context of a fluid separation system 10. The system 10 includes an electrostatic coalescer 15 disposed upstream of a separator 20. The electrostatic coalescer 15 is resident in a fluid stream defined by piping 25.

For purposes of the following discussion, a fluid stream may be a primarily liquid stream of a primarily gas stream. In the illustrated embodiment, the electrostatic coalescer 15 is operable to increase the size of liquid droplets in a process fluid, such as a hydrocarbon fluid. For example, the coalesced liquid may be water present in a liquid hydrocarbon stream or a gas stream (e.g., natural gas). Of course, the particular fluid provided to the electrostatic coalescer 15 may vary, and fluids other than hydrocarbon fluids may be processed. The liquid coalesced from the process fluid may also vary, with water being only one illustrative example. In another example, liquids may be separated from the process gases (e.g., chlorine or HCl). Water droplet sizes in chlorine gas streams may be enlarged by the electrostatic coalescer 15 to more effectively remove water from the chlorine, before dealing with the gaseous water vapor.

The separator 20 operates to remove at least a portion of the liquid present in the process fluid and provides a process fluid outlet 30 and a coalesced liquid outlet 35. The construction and operation of the electrostatic coalescer 15 is described in greater detail below with respect to FIGS. 2 and 3. The application of the present subject matter is not limited to any particular embodiment of the separator 20. Exemplary separator types include horizontal/gravity separators and enhanced gravity separators (e.g., cyclone based separation technology). In some embodiments, the electrostatic coalescer 15 and the separator 20 may be integrated into a single unit.

Estimations and experience of electro-coalescence in liquid-liquid systems show that the necessary value of electrical field to produce coalescence in a liquid-gas system should be in the range $10^3$–$10^4$ V/cm. Typical values of electrical fields, which cause auto electron emission (i.e., the only charging mechanism for the droplets by electrostatic fields) are in the range larger than $10^7$ V/cm, so the above electrical field will not produce any charging of the droplets.

In cases where the fluid being processed by the electrostatic coalescer 15 is primarily gas, it is possible to generate an electric field across a gas due to the fact that gases are good insulators. In such an electric field, charged particles are attracted to one of the electrode plates 45. Uncharged particles will be polarized, and due to dipole-dipole interaction, an attractive force between them will appear, while they remain unattracted by the electrode plates 45. The forces generated by the electrical field in the coalescer 15 are too weak to ionize the free particles.

Although this description illustrates the separation of water from a hydrocarbon fluid, the electrostatic coalescer 15 may be applied to applications with other emulsions where the specific resistance of the continuous phase is larger than about $10^7$ Ohm*m and where the electric permeability of continuous and disperse phases are different. For example, the water droplet sizes in hydrocarbon gas streams may be enlarged by the electrostatic coalescer 15 to more effectively dry the gas. In general, more conductive emulsions may require higher frequencies of the applied voltage.

In general, the electrostatic coalescer 15 is more effective in causing coalescence when the water cut is at least about 2%. This amount may vary depending on the particular process fluid and flow rate. In cases where the water cut of the process fluid is less than an efficient value, a water injection port 37 may be disposed upstream of the electrostatic coalescer 15 to increase the water content of the process fluid prior to coalescence and separation.

Figure 2:
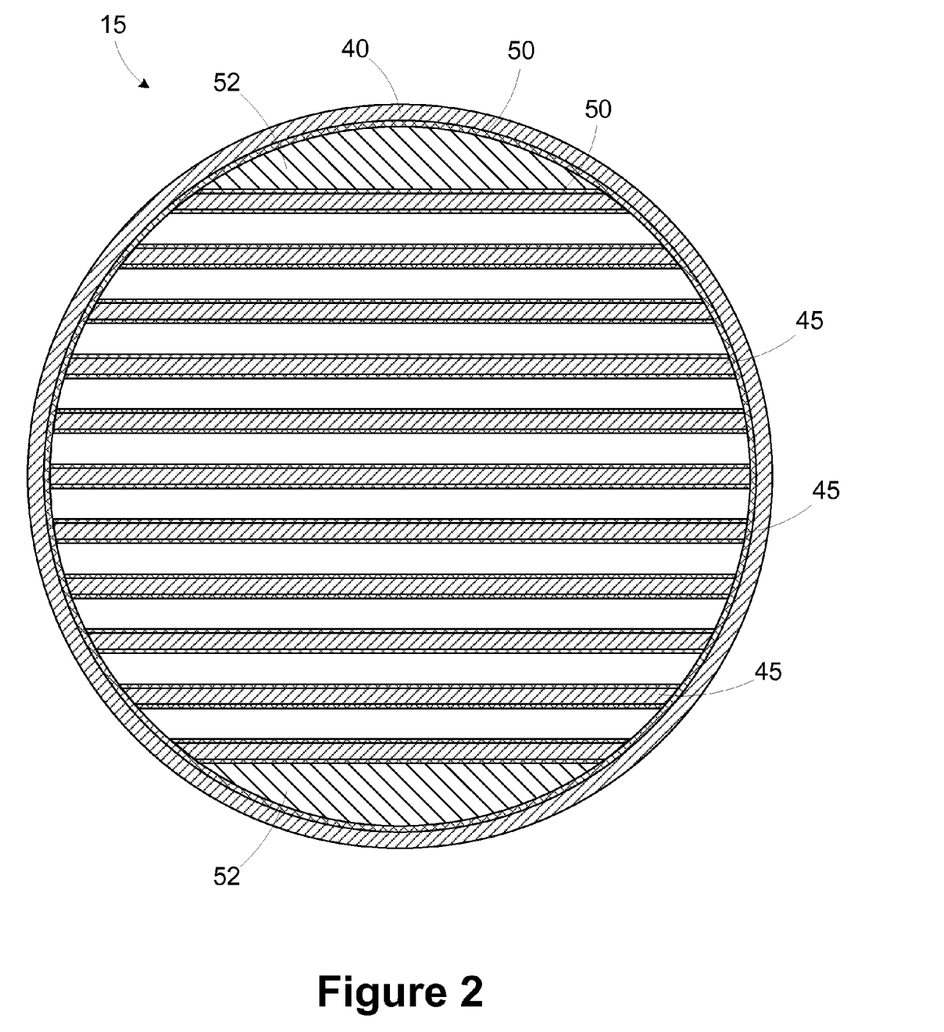
FIG. 2 is a simplified cross-section view of an electrostatic coalescer in the system of FIG. 1.

FIG. 2 illustrates a cross-section view of the electrostatic coalescer 15. In the illustrated embodiment, the diameter of an outer wall 40 of the electrostatic coalescer 15 roughly corresponds to the diameter of the piping 25 in which it is installed to provide an in-line arrangement. Fluid passing through the piping 25 passes through the electrostatic coalescer 15 at substantially the same flow rate. A plurality of electrode plates 45 are provided in the electrostatic coalescer 15 through which the fluid travels. In some embodiments, obstructive elements 52 may be provided in the areas where no electrical field is generated to ensure the exposure of all of the fluid to the electrical fields.

The electrostatic field generated by the electrode plates 45 polarizes liquid droplets in the process stream to locally neutralize the electrostatic field. The polarized droplets are not attracted by the homogeneous field to one of the electrodes 45 because the net charge of the droplet is zero. The polarized droplets do feel the gradient of the electrostatic field at short range of other droplets. In this manner, the droplets are attracted to one another.

The particular geometry of the electrode plates 45 (e.g., arrangement, number, thickness, etc.) may vary depending on factors associated with the particular implementation, such as process fluid, piping diameter, fluid pressure, expected flow rate, etc. For example, the spacing of the electrode plates 45 may vary depending on the processed fluid. The electrode plates 45 in a gas coalescer may be spaced more closely together than in a liquid coalescer. This reduced spacing may be achieved by reducing the diameter of the coalescer 15 as compared to that of the piping 25 to allow the same number of electrode plates 45 to be used, but spaced more closely. Alternatively, the diameter may not be reduced, but the number of electrode plates 45 may be increased. In some applications, long electrode plates 45 having a length several times the diameter of the electrostatic coalescer 15 may be used to increase the residence time or to lower the required field strength.

As illustrated in FIG. 2, the inside surface of the outer wall 40 and the electrode plates 45 are coated with a protective layer 50. Generally, the protective layer 50 protects the electrode plates 45 from erosive or corrosive effects of the process fluid (e.g., due to particles or chemicals in the process fluid) and may also serve as an electrical insulator to reduce the likelihood of arcing between adjacent electrode plates 45. Exemplary materials for the protective layer 50 include epoxy, electrically non-conducting ceramics, plastic coatings, etc. formed using processes such as molding, chemical vapor deposition, physical vapor deposition sintering, etc. Alternatively, electrically insulating layers may be combined with other protective layers on the outside surfaces to meet the mechanical requirements of the application (e.g., abrasion resistance or corrosion resistance). For example, an insulating epoxy coating may be covered by a ceramic conducting coating. The particular insulator and/or abrasion resistant coating selected may vary depending on mechanical requirements, cost, and material electrical properties (e.g., dielectric constant).

The electrode plates 45 may be sized and arranged to provide for a relatively high Reynolds number, thereby providing turbulent flow of the process fluid through the electrostatic coalescer 15. Turbulent flow causes the velocity of the process fluid to vary in a random manner, causing an increase in the small-scale movements of the fluid. This increase in movement makes it more likely that water droplets in the process stream will come in close proximity with one another. At this close proximity, the dipolar interaction induced by the electrostatic field described above will be stronger, thereby increasing coalescence.

Figure 3:
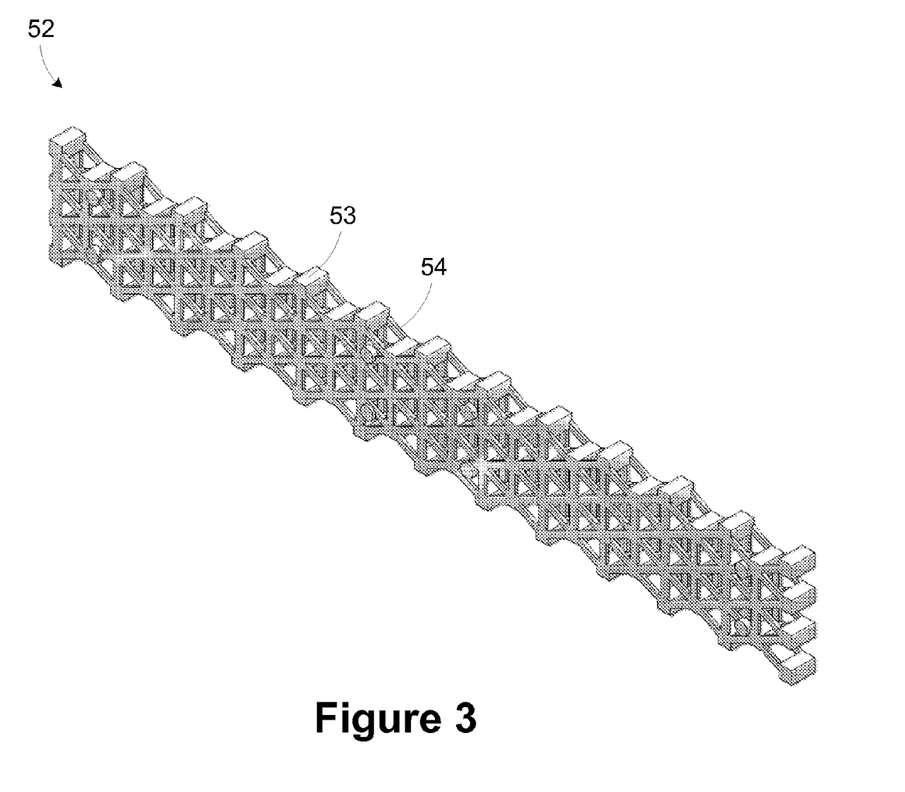
FIG. 3 is a diagram of a flow disrupting element that may be used in the electrostatic coalescer of FIG. 2.

In one embodiment illustrated in FIG. 3, one or more flow disrupting elements 52 may be provided in the electrostatic coalescer 15 to enhance microturbulence between the electrode plates 45. The flow disrupting element 52 may be fabricated from an electrically insulative material, such as a ceramic, plastic, or other electrically-non-conductive solid material. The flow disrupting element 52 includes a plurality of pillars 53 interconnected by cross members 54 in a grid arrangement. The grid disrupts the flow of process fluid through the electrostatic coalescer 15 to increase turbulence. The flow disrupting element 52 may be positioned between adjacent electrode plates 45. The sizing of the flow disrupting element 52 may vary depending on the particular arrangement and sizing of the electrode plates 45. Flow disrupting elements 52 may not be required in implementations where the flow rate and Reynolds number are sufficiently high to provide turbulent flow.

In an application where the fluid stream exhibits a high degree of laminar flow, the central part of the stream will have a much higher speed than the part along the walls. This flow characteristic may result in a short residence time between the electrode plates 45 In addition to or in place of the flow disrupting elements 52 to induce turbulence, flow guides may be provided to make the distribution of flow over the electrode plates 45 more even in terms of kg/hour, resulting in a better use of the electrostatic coalescer 15.

Figure 4:
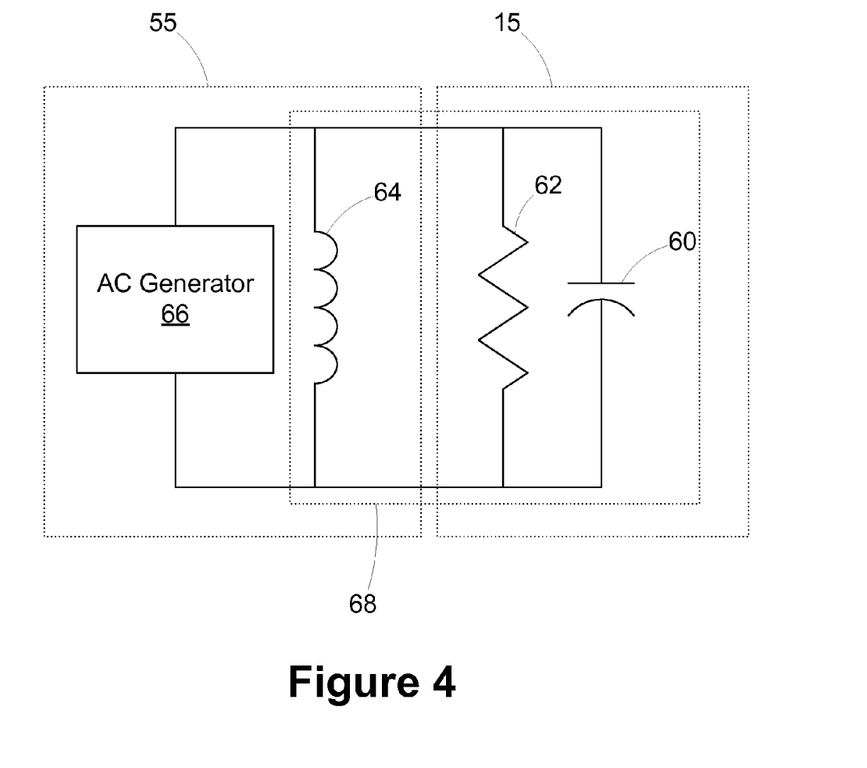
FIG. 4 is a simplified block diagram of a control circuit of the electrostatic coalescer of FIG. 1.

Referring to FIG. 4, a simplified block diagram of a control circuit 55 of the electrostatic coalescer 15 is provided. The properties of the process fluid affect the net electrical characteristics of the electrostatic coalescer 15. Hence, the electrostatic coalescer 15 is modeled as a capacitor 60 in parallel with a resistor 62 representing the net capacitance and resistance defined by the arrangement of the electrode plates 45 and the process fluid passing through them. The control circuit 55 includes an inductor 64 and an alternating current (AC) generator 66. Collectively, the inductor 64 and the capacitor 60 and resistor 62 that model the electrostatic coalescer 15 and process fluid define a resonant circuit 68. In general, the AC generator 66 maintains its output frequency at the resonant frequency of the resonant circuit 68 to minimize the current needed to drive the electrostatic coalescer 15. The AC generator 66 generates a variable frequency sinusoidal waveform that is applied to the electrode plates 45 to foster coalescence in the process fluid.

Figure 5:
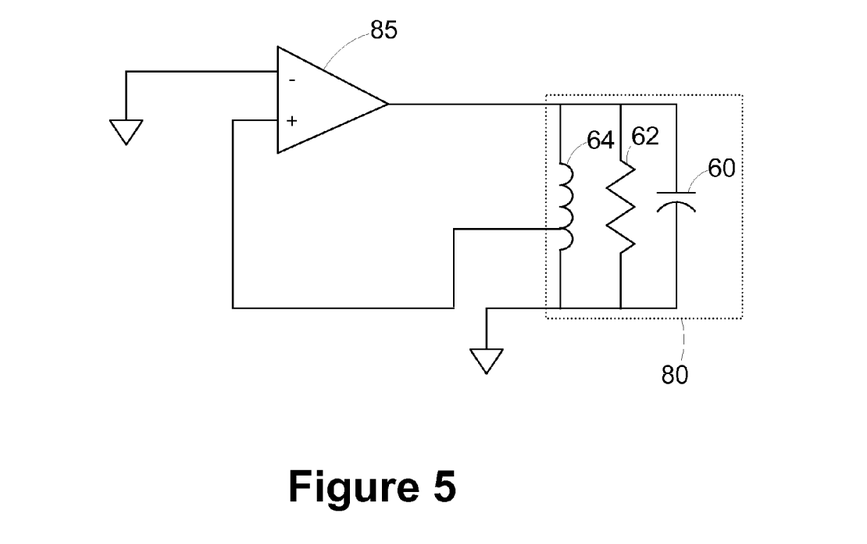
FIG. 5 is a simplified diagram of a positive loop that may be employed in an AC generator in the control circuit of FIG. 4.

In one embodiment, the AC generator 66 may be an autogenerator circuit. As known to those of ordinary skill in the art, an autogenerator is generally an amplifier with large amplification having an exit connected to the entrance, commonly referred to as a positive loop. The positive loop includes a resonant circuit that defines the frequency of oscillation. In this embodiment, the resonant circuit 68 is coupled to the positive loop of the AC generator 66, thereby providing for passive frequency adjustment of the AC generator 66 corresponding to the resonant frequency of the resonant circuit 68. FIG. 5 illustrates how the resonant circuit 68 is incorporated into the positive loop of the AC generator 66 through a comparator 85. Because of the positive feedback, the AC generator 66 operates at the resonant frequency of the resonant circuit 68. Because the inductor 64 is fixed, the frequency adjusts according to the varying properties of the process fluid and the resulting capacitance of the electrostatic coalescer 15. As the properties of the fluid change over time, the AC generator 66 automatically maintains its output at the varying resonant frequency, thereby minimizing the current requirements required for driving the electrostatic coalescer 15.

Figure 6:
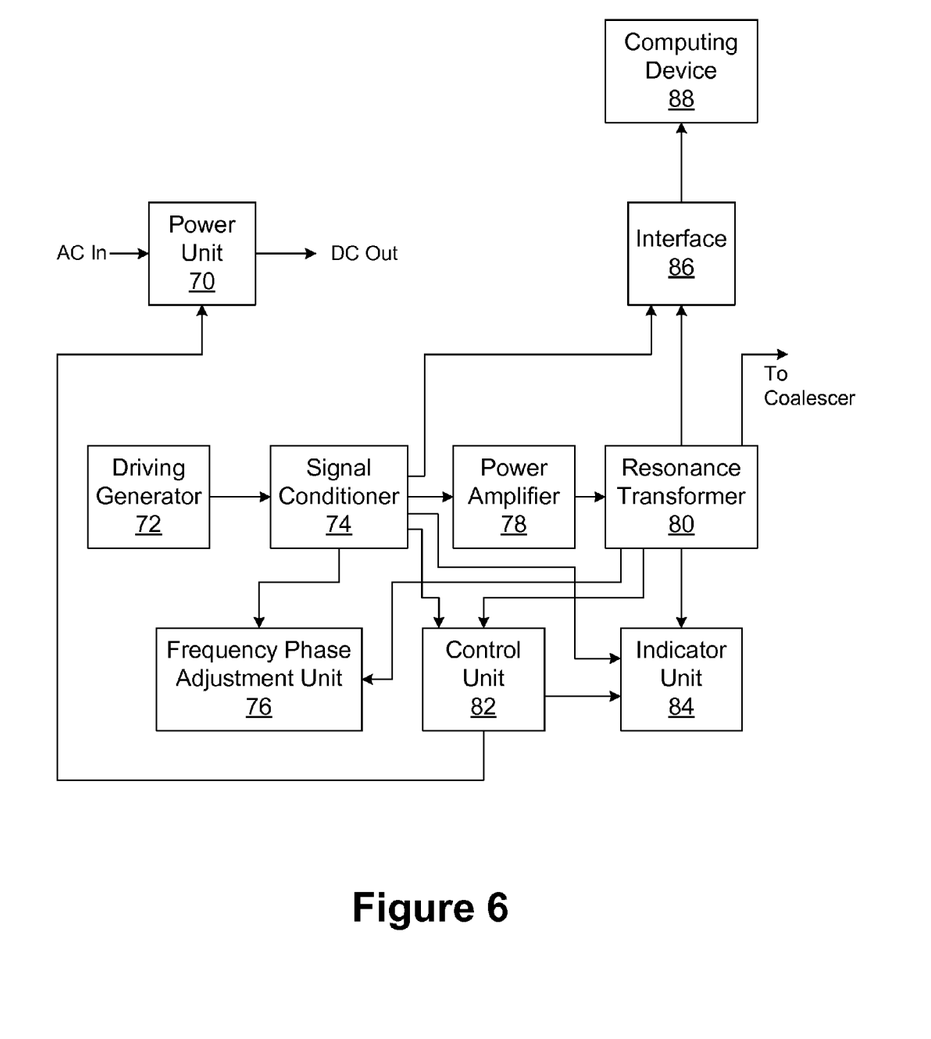
FIG. 6 is a simplified block diagram of an autogenerator circuit that may be employed in the control circuit of FIGS. 4 and 5.

FIG. 6 is a simplified block diagram of the autogenerator circuit that may be employed for the AC generator 66. The autogenerator circuit includes a power unit 70 that receives an AC input voltage (e.g., 220V, 50 Hz) and generates DC output voltages (e.g., +300V, +50V, +12V, +9V, etc.) for powering the other units of the circuit. A driving generator 72 produces driving pulses at double frequency. A signal conditioner 74 produces signals for a frequency phase adjustment unit 76 and for switching the gates of transistors in a power amplifier 78. The power amplifier 78 is a push-pull amplifier. The frequency phase adjustment unit 76 compares the phases of the driving generator 72 and an output signal and adjusts the frequency of the driving generator 72 to achieve resonance with varying load characteristics. A resonance transformer 80 forms a sinusoidal output signal with an amplitude up to 3 kV, for example for powering the electrostatic coalescer 15. A positive feedback path exists between the resonance transformer 80 and the frequency phase adjustment unit 76.

A control unit 82 controls the frequency and amplitude of the output signal, and in response to a condition that exceeds defined limits, sets the AC generator 66 into a safe mode (i.e., low power). An indicator unit 84 indicates the parameters of the output signal. An interface 86 may be provided for connecting the AC generator 66 to an external computing device 88, such as a personal computer, controller, or some other general purpose or special purpose computing device for allowing tracking of device parameters, such as frequency, amplitude and consumed power, or to allow operator intervention or system configuration.

Figure 7:
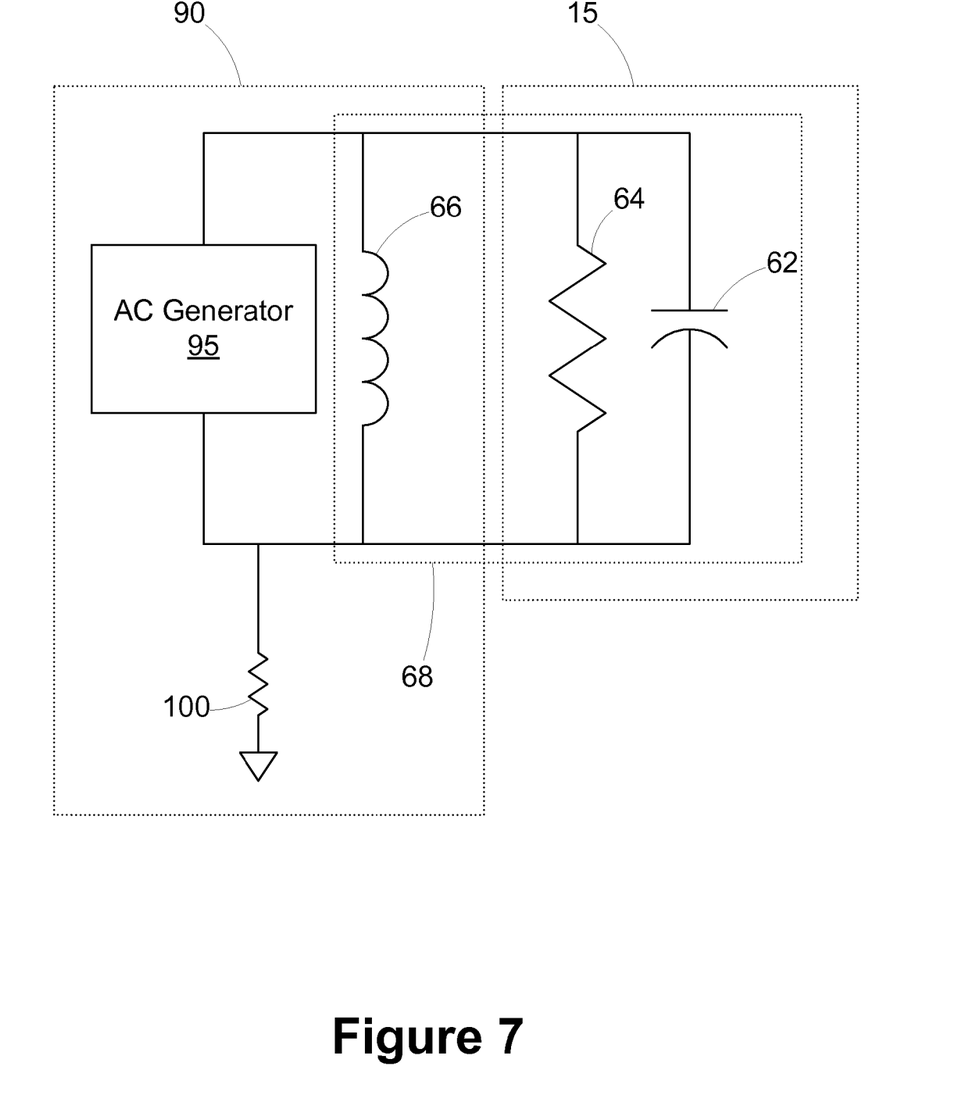
FIG. 7 is a simplified block diagram of an alternative embodiment of a control circuit of the electrostatic coalescer of FIG. 1.

FIG. 7 illustrates an alternate embodiment of a control circuit 90, where an AC generator 95 is a signal generator that outputs a configurable frequency signal. For example, the AC generator 95 may be a voltage controlled oscillator. The voltage at a resistor 100 represents a measure of the output current of the control circuit 90 for driving the electrostatic coalescer 15. The AC generator 95 measures the output current and automatically adjusts its output frequency to minimize the value of the measured voltage, which corresponds to a resonance condition. Hence, the AC generator 95 actively adjusts its output frequency based on the measured drive current to obtain the resonant frequency of the resonant circuit 68.

Generally, the frequency of the oscillation is above 1 kHz due to the relaxation time associated with most types of crude oil, which is in the range of 0.02-0.003 seconds. In the illustrated embodiment, it is assumed that the capacitance is about 0.1 µF and the nominal frequency is about 10 kHz, which provides for and inductance of about 3 mH. Of course, the inductor 64 may be sized differently based on different assumptions about the process fluid and geometry of the electrostatic coalescer 15. The Q value corresponding to the resonance condition that results in the diminishing of the drive current is given by:

$$Q = 2\omega L/R$$

Monitoring the frequency of the control circuit 55, 90 provides information regarding the capacitance of the electrostatic coalescer 15, and therefore the water cut. The power consumption of the electrostatic coalescer 15 is defined by the resistance of the process fluid. The electrical resistance of the process fluid and the value of the water cut characterize the quality of the process fluid being processed. The resistance can provide information regarding the salinity of the process fluid. The water cut of the process fluid entering the electrostatic coalescer 15 effectively defines the final wafer cut after the separator 20. Hence, by utilizing the water cut and resistance information, diagnostic tools may be defined to characterize the process fluid.

Figure 8:
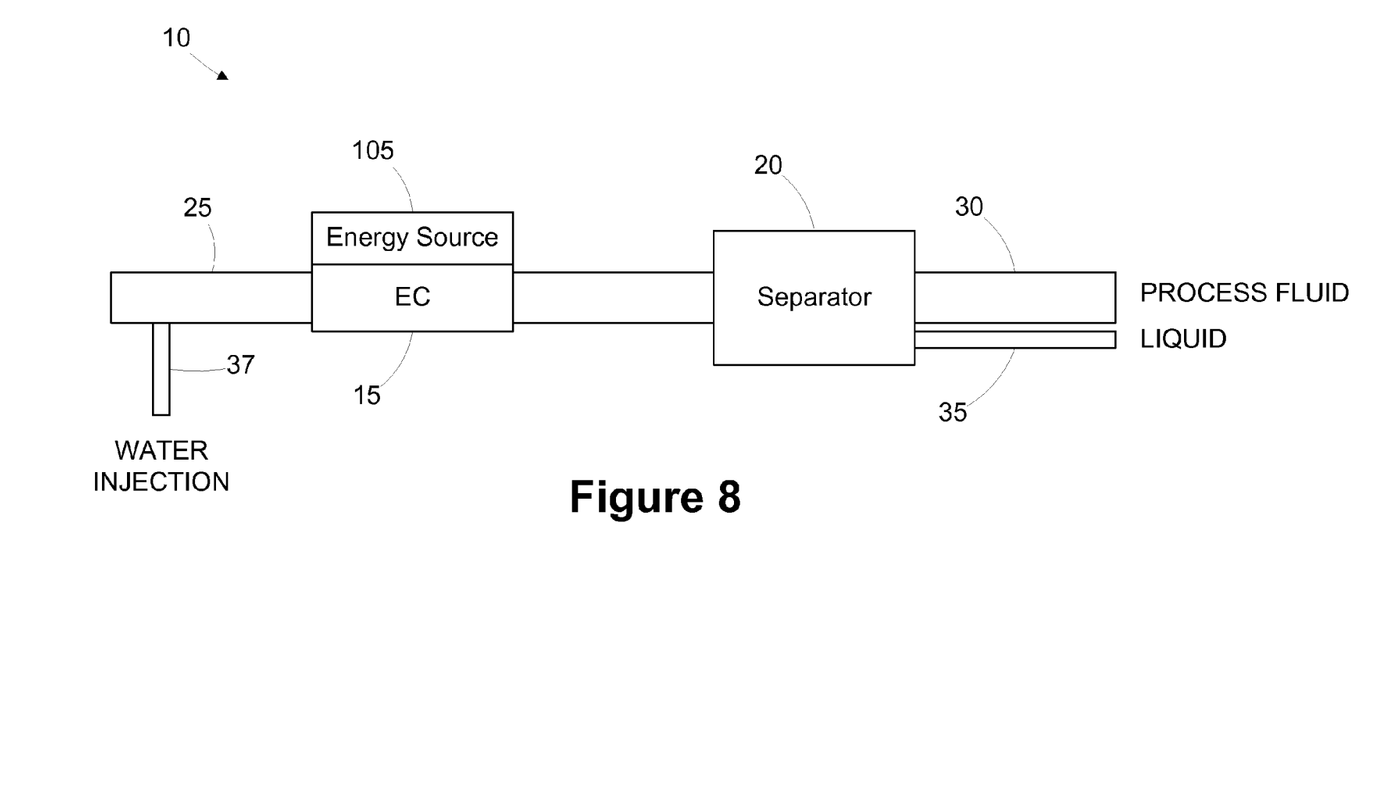
FIG. 8 is a simplified block diagram of a fluid separation system incorporating an external energy source with an electrostatic coalescer.

In some embodiments, the efficiency of the coalescence may be enhanced by providing an external energy source that operates in conjunction with the electrostatic coalescer 15. As shown in FIG. 8, an energy source 105 may be coupled to the electrostatic coalescer 15. Exemplary energy sources include microwave or ultrasound devices. Exposing the process fluid to a microwave or ultrasonic energy field may increase the coalescence provided by the electrostatic coalescer 15. The need for an external energy source 105 may depend on characteristics such as the size of the electrostatic coalescer 15, the characteristics of the process fluid, the flow rate, etc. Information gathered from the resonant frequency of the resonant circuit 68, which defines the characteristics of the process fluid, may be used to tune the external energy source 105. For example, experiments may be conducted to identify the optimal frequency or amplitude characteristics of the microwave or ultrasound signals based on the characteristics of the process fluid. A correlation between the determined resonant frequency and the external energy source characteristics may then be determined to increase the effectiveness of the external energy source 105.

Figure 9:
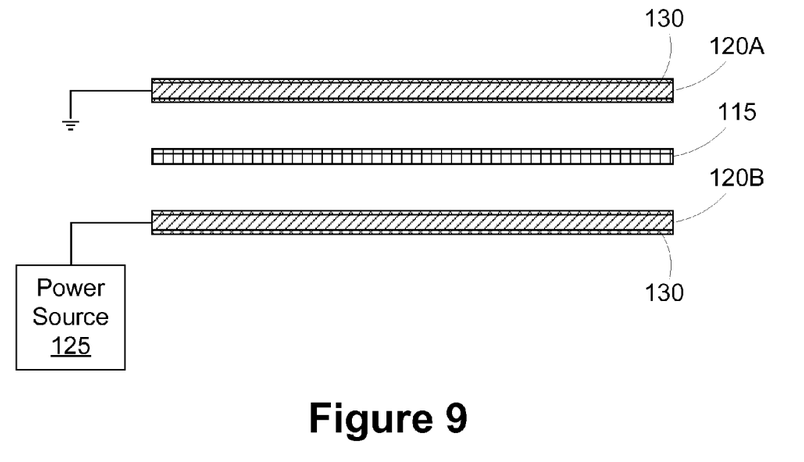
FIGS. 9 and 10 are cross-section views of an alternative embodiment of an electrostatic coalescer with intermediate insulating members disposed between electrode plates.

In another embodiment illustrated in FIG. 9, an electrostatic coalescer 110 may be provided with an intermediate insulating member 115 disposed between the electrode plates 120A, 120B to define a first flow path between the insulating member 115 and the first electrode plate 120A and a second flow path between the insulating member 115 and the second electrode plate 120B. One or more insulating members 115 may be disposed between the pair of electrode plates 120A, 120B to define additional flow paths therebetween (e.g. a third flow path between adjacent insulating members 115). Although only two electrode plates 120A, 120B are illustrated, different configurations may be used, including the arrangement shown in FIG. 2, where parallel plate electrodes are used. In such a case one or more insulating members 115 may be disposed between each pair of electrode plates 45. Of course other geometries may also be used.

For purposes of illustration, the electrode plate 120A is grounded, and the electrode plate 120B is coupled to a power source 125, such as one of the power sources 66, 95 described above, or a different power source. Typically, the electrode 120B is coated with a protective layer 130 to protect the electrode plate 120B from erosive or corrosive effects of the process fluid (e.g., due to particles or chemicals in the process fluid). The protective layer 130 may also serve as an electrical insulator to reduce the likelihood of arcing. The grounded electrode plate 120A may or may not have a protective layer 130. The resonant circuit 68 described above may or may not be implemented in the electrostatic coalescer 110.

The insulating member 115 disposed between the two electrode plates 120A, 120B increases coalescence efficiency. Coalescence of droplets in another medium relies on the polarization of conducting liquid particles in an electrical field. Due to the required high field, and the preference not to use very high voltages, the electrodes are normally disposed in close proximity to one another. Under normal circumstances, water droplets that happen to be in-line with the electrical field, will be aligned in a "chain" of water droplets that do not coalescence effectively because the attraction to a droplet in the middle of the chain to one side will be equal to that to the other side, negating the attraction, while the droplets on the electrode will not release. Only droplets on free ends will move and, thereby, coalesce. This chain of droplets reduces the field strength, and therefore the coalescence, which reduces the efficiency of the coalescence. In some cases, where high field and long chains are present, sparking can occur. The higher the water concentration, the more droplets are present, and therefore the higher the influence of this effect. The insulating member 115 tends to break up these chains or even prevent them from forming, resulting in a higher coalescence efficiency.

The insulating member 115 may be hydrophilic (i.e., water attracting) or hydrophobic (i.e., water repelling). The attractive forces between water and a hydrophilic surface are relatively small compared to those found in electric fields. The dielectric constant of the material used for the insulating member 115 may vary depending on the particular implementation. If an insulator with high dielectric constant (i.e., higher than the surrounding medium) is used, the influence the droplets experience from each other, even assuming contact between the droplets and the surface of the insulator, will be smaller than the thickness would predict. Therefore, in situations where not much space is present between electrodes 120A, 120B, a thin, high dielectric constant insulator may be used. On the other hand, due to mechanical requirements, the insulating member 115 may, in some cases, be rather thick, which would result in a preference for an insulator with a low dielectric constant. Where a material with a high dielectric constant is combined with one with a low constant in an electrical field, the electrical field strength will concentrate in the high dielectric constant material. A lower dielectric constant material for the insulating member 115 will support the goal of building the electrical field over the medium to be coalesced by reducing the fields in the insulating member 115, thereby allowing a smaller applied voltage and resulting in safer operations with less power consumption.

Figure 10:
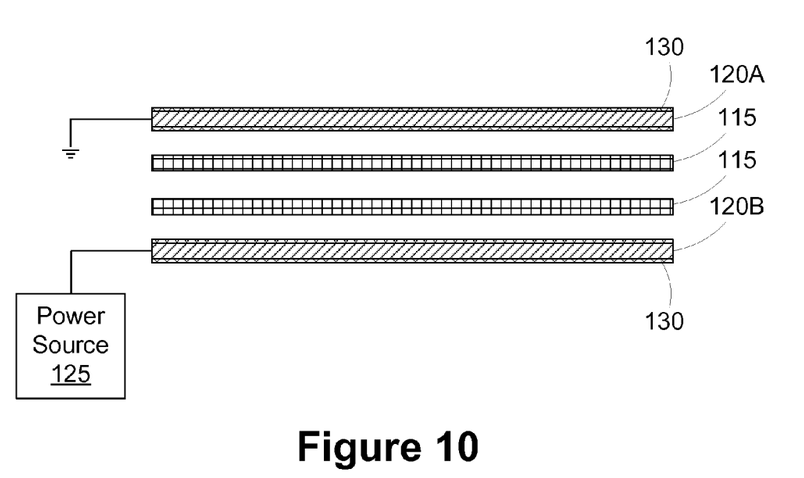

Providing multiple insulating members 115 between the electrode plates 120A, 120, as shown in FIG. 10, tends to further increase the efficiency of the coalescence. The region between the insulating members 115 will be free of water droplet chains, which were found to reduce efficiency. By placing the insulating members 115 close to the electrodes 120A, 120B (i.e., without merging with them, which would reduce the insulator function), a higher efficiency can be obtained.

In contrast to electro coalescence of water in water-in-oil systems, the conductivity of gases is far less than the conductivity of crude oils. This circumstance makes it possible to use a DC voltage power source to create an electrical field in the gas media. In some applications, the electrostatic coalescer 15 may be employed in a gas application and a controlled resonance AC power source may be used.

Figure 11:
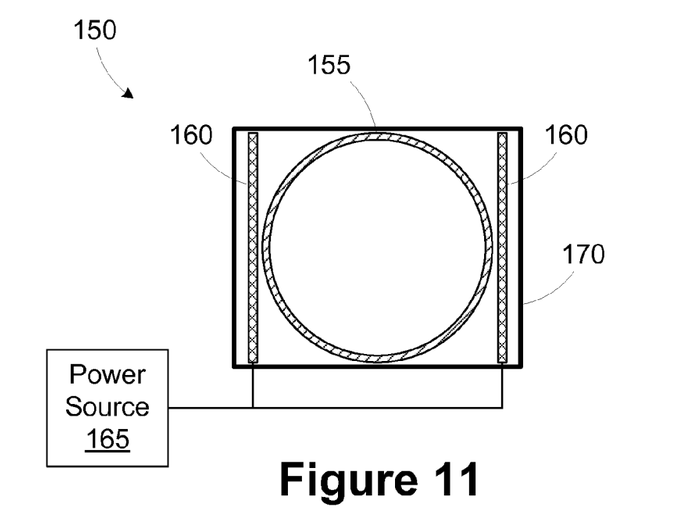
FIGS. 11 and 12 are cross-section views of an electrostatic coalescer in accordance with another illustrative embodiment of the present invention.

FIG. 11 illustrates an alternative embodiment of an electrostatic coalescer 150 that may be employed in an application where the process fluid is primarily gas. The electrostatic coalescer 150 includes an outer wall 155 and external electrodes 160 coupled to a power source 165. The outer wall may be an electrically insulating material. An enclosure 170 may be provided around the external electrodes 160 for protective purposes. In the illustrated embodiment, the power source 165 is a DC power source, however, an AC source may also be used. The use of the external electrodes 160 allows the electrical field to be generated while minimizing the obstruction of the flow.

Figure 12:
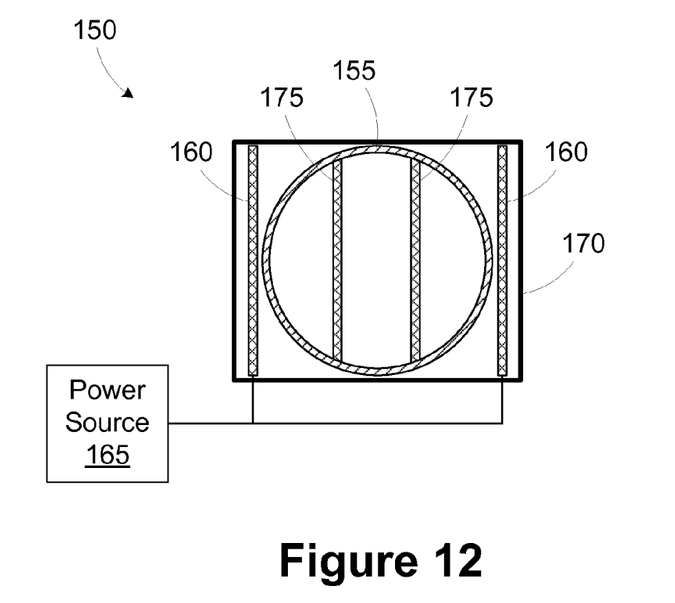

In yet another embodiment shown in FIG. 12, the electrostatic coalescer 150 described in reference to FIG. 11 may be provided with one or more electrically conductive members 175 disposed between the external electrodes 160 to increase the electrical field strength. The conductive members 175 are not connected to any power source, so they do not operate as electrodes. The conductive members 175 may be coated to provide the required characteristics, as described above in relation to the electrode plates 45. Interposed conductive members 175 may also be used in the embodiment illustrated in FIG. 2.

Although the electrostatic coalescers 15, 110, 150 are illustrated and described herein as being in-line devices, it is contemplated that the techniques described herein may be applied to other types of coalescers, such as vessel based coalescers.

The use of an electrostatic force to coalesce liquid droplets in a fluid flow allows more efficient downstream removal of the droplets, thereby reducing the demands on the removal equipment and lowering its cost or increasing the amount of liquid that can be removed, thereby providing a higher purity processed fluid.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

The invention claimed is:

1. An electrostatic coalescer, comprising:
   a structure comprising an outer wall with an electrically insulating material formed on an entire inner surface of the outer wall so as to define an entirely insulated flow path for receiving a process fluid comprising primarily a gas, wherein the flow path is free of any portion of the structure;
   a power source;
   a plurality of planar, spaced-apart electrode plates that are positioned within the entirely insulated flow path and positioned substantially parallel to one another wherein a space is defined between two adjacent planar, spaced-apart electrode plates, wherein said planar, spaced-apart electrode plates are adapted to be electrically coupled to said power source so as to generate an electrical field across said flow path, wherein substantially the entirety of each of said plurality of planar, spaced-apart electrode plates is coated with an insulative material; and
   at least one insulating member disposed in the space and spaced apart from the two adjacent planar, spaced-apart electrode plates.

2. The electrostatic coalescer of claim 1, wherein said power source comprises a direct current power source.

3. The electrostatic coalescer of claim 1, further comprising:
   a controller, comprising:
      an inductor coupled in parallel with said plurality of planar, spaced-apart electrode plates, said inductor and said plurality of planar, spaced-apart electrode plates defining a resonant circuit; and a signal generator coupled to said power source and said plurality of planar, spaced-apart electrode plates and operable to apply an alternating current signal to said plurality of planar, spaced-apart electrode plates at a frequency corresponding to a resonant frequency of said resonant circuit in the presence of said process fluid.

4. The electrostatic coalescer of claim 1, wherein said outer wall defines a pipe having a circular cross section.

5. The electrostatic coalescer of claim 1, further comprising at least one conductive member not coupled to said power source, the at least one conductive member being disposed in the space between the two adjacent planar, spaced-apart electrode plates.

6. The electrostatic coalescer of claim 1, further comprising at least one flow disrupting element disposed in a space between two other adjacent planar, spaced-apart electrode plates.

7. The electrostatic coalescer of claim 1, wherein said outer wall defines a vessel.

8. The electrostatic coalescer of claim 1, wherein each of said plurality of planar, spaced-apart electrode plates extends across said entirely insulated flow path and opposite ends of each of said plurality of planar, spaced-apart electrode plates contact said electrically insulating material positioned on said entire inner surface of said outer wall.

9. An electrostatic coalescer, comprising:
a structure having an outer wall having an entire inner surface;
electrically insulating material positioned on said entire inner surface of said outer wall so as to define an entirely insulated flow path that is free of any portion of the structure;
a power source; and
a plurality of planar, spaced-apart electrode plates that are positioned in the entirely insulated flow path and oriented substantially parallel to one another, wherein said planar, spaced-apart electrode plates are adapted to be electrically coupled to said power source so as to generate an electrical field between at least two adjacent planar, spaced-apart electrode plates, wherein opposite ends of each of said plurality of planar, spaced-apart electrode plates contact said electrically insulating material positioned on said entire inner surface of said outer wall and wherein each of said plurality of planar, spaced-apart electrode plates is coated with an insulative material.

10. The electrostatic coalescer of claim 9, wherein said power source comprises a direct current power source.

11. The electrostatic coalescer of claim 9, further comprising:
a controller, comprising:
an inductor coupled in parallel with said plurality of planar, spaced-apart electrode plates, said inductor and said plurality of planar, spaced-apart electrode plates defining a resonant circuit; and
a signal generator coupled to said power source and said plurality of planar, spaced-apart electrode plates and operable to apply an alternating current signal to said plurality of planar, spaced-apart electrode plates at a frequency corresponding to a resonant frequency of said resonant circuit in the presence of a process fluid.

12. The electrostatic coalescer of claim 9, wherein said outer wall defines a pipe having a circular cross section.

13. The electrostatic coalescer of claim 9, further comprising at least one insulating member disposed in a space between two adjacent planar, spaced-apart electrode plates, the at least one insulating member being spaced apart from the two adjacent planar, spaced-apart electrode plates.

14. The electrostatic coalescer of claim 9, further comprising at least one conductive member not coupled to said power source, the at least one conductive member being disposed in a space between two adjacent planar, spaced-apart electrode plates, the at least one conductive member being spaced apart from the two adjacent planar, spaced-apart electrode plates.

15. The electrostatic coalescer of claim 9, further comprising at least one flow disrupting element positioned in a space between said insulative material on two adjacent planar, spaced-apart electrode plates.

16. The electrostatic coalescer of claim 9, wherein said outer wall defines a pipe.

17. An electrostatic coalescer, comprising:
a structure having a circular cross section with an entire inner surface;
electrically insulating material positioned on said entire inner surface of said structure so as to define an entirely insulated flow path that is free of any portion of the structure;
a power source; and
a plurality of planar, spaced-apart electrode plates that are positioned in the flow path and oriented substantially parallel to one another, wherein said plurality of planar, spaced-apart electrode plates are adapted to be electrically coupled to said power source so as to generate an electrical field between at least two adjacent planar, spaced-apart electrode plates, the opposite ends of each of said plurality of planar, spaced-apart electrode plates contacting said electrically insulating material positioned on said inner surface of said structure and wherein each of said plurality of planar, spaced-apart electrode plates is coated with an insulative material.

18. The electrostatic coalescer of claim 17, wherein said power source comprises a direct current power source.

19. The electrostatic coalescer of claim 17, further comprising:
a controller, comprising:
an inductor coupled in parallel with said plurality of planar, spaced-apart electrode plates, said inductor and said plurality of planar, spaced-apart electrode plates defining a resonant circuit; and
a signal generator coupled to said power source and said plurality of planar, spaced-apart electrode plates and operable to apply an alternating current signal to said plurality of electrode plates at a frequency corresponding to a resonant frequency of said resonant circuit in the presence of a process fluid.

20. The electrostatic coalescer of claim 17, wherein said structure is one of a pipe or a vessel.

21. The electrostatic coalescer of claim 17, further comprising at least one insulating member disposed in a space between two adjacent planar, spaced-apart electrode plates, the at least one insulating material being spaced apart from the two adjacent planar, spaced-apart electrode plates.

22. The electrostatic coalescer of claim 17, further comprising at least one conductive member not coupled to said power source, the at least one conductive member being disposed between two adjacent planar, spaced-apart electrode plates, the at least one conductive member being spaced apart from the two adjacent planar, spaced-apart electrode plates.

23. The electrostatic coalescer of claim 17, further comprising at least one flow disrupting element positioned in a space between said insulative material on two adjacent planar, spaced-apart electrode plates.

* * * * *